United States Patent
Utsumi et al.

[11] Patent Number: 6,144,463
[45] Date of Patent: *Nov. 7, 2000

[54] FACSIMILE MACHINE HAVING COMPUTER-LINKED MODE

[75] Inventors: Masahiro Utsumi, Jouyou; Kunji Okazaki, Mukou; Shinji Kawasaki, Uji; Shinichi Tanaka, Nagaokakyo, all of Japan

[73] Assignee: Murata Kikai Kabushiki Kaisha, Kyoto, Japan

[*] Notice: Under 35 U.S.C. 154(b), the term of this patent shall be extended for 1017 days.

[21] Appl. No.: 08/668,716

[22] Filed: Jun. 24, 1996

Related U.S. Application Data

[63] Continuation of application No. 08/453,581, May 26, 1995, abandoned, which is a continuation of application No. 07/913,241, Jul. 14, 1992, abandoned.

[30] Foreign Application Priority Data

Jul. 16, 1991 [JP] Japan ................................ 3-202386

[51] Int. Cl.[7] .................................................. H04N 1/00
[52] U.S. Cl. ........................................ 358/442; 358/446
[58] Field of Search .............................................. 358/434

[56] References Cited

U.S. PATENT DOCUMENTS

| | | | |
|---|---|---|---|
| 4,652,933 | 3/1987 | Koshiishi | 358/256 |
| 4,964,154 | 10/1990 | Shimotono | 358/442 |
| 4,965,676 | 10/1990 | Ejiri et al. | 258/406 |
| 4,991,200 | 2/1991 | Lin | 358/468 |
| 5,200,830 | 4/1993 | Imaizumi et al. | 358/468 |

*Primary Examiner*—Bernard Roskoski
*Attorney, Agent, or Firm*—Hogan & Hartson LLP

[57] ABSTRACT

A facsimile machine is connected to another facsimile machine by a telephone line and to a computer by an exclusive line. The facsimile machine has a computer-linked mode and an ordinary facsimile mode. If the facsimile machine is in the computer-linked mode, the image data transmission between the facsimile machine and the computer is performed based on an instruction command from an operator of the computer. If the facsimile machine is in the ordinary facsimile mode, the image data transmission between the facsimile machine and another facsimile machine is performed in an ordinary facsimile transmission manner. When an instruction command comes from the computer, the facsimile machine sends a response signal (or message) to the computer in answer to the instruction command. Thus, the facsimile machine operates under the supervision of the computer. This improves the control reliability.

15 Claims, 10 Drawing Sheets

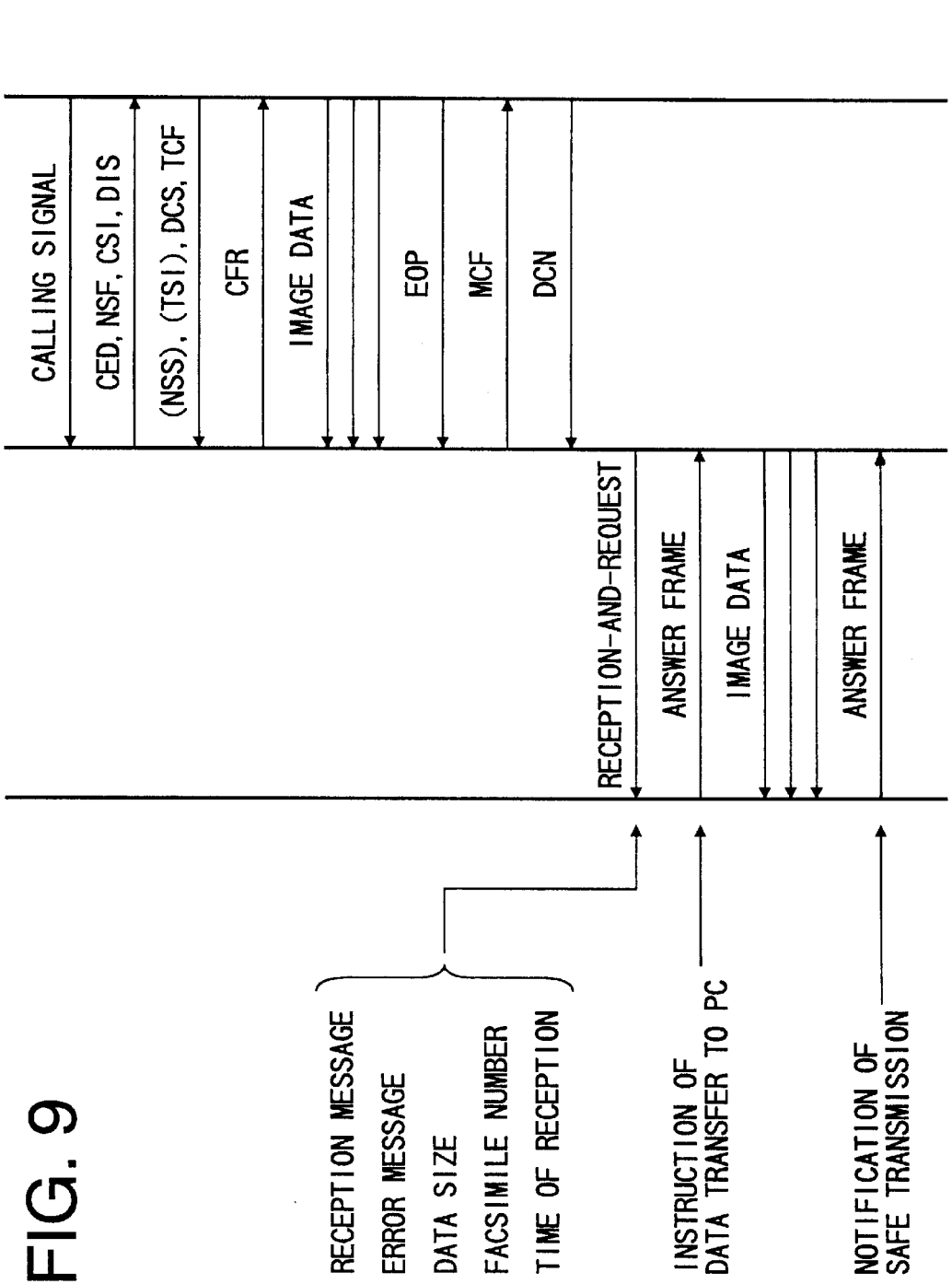

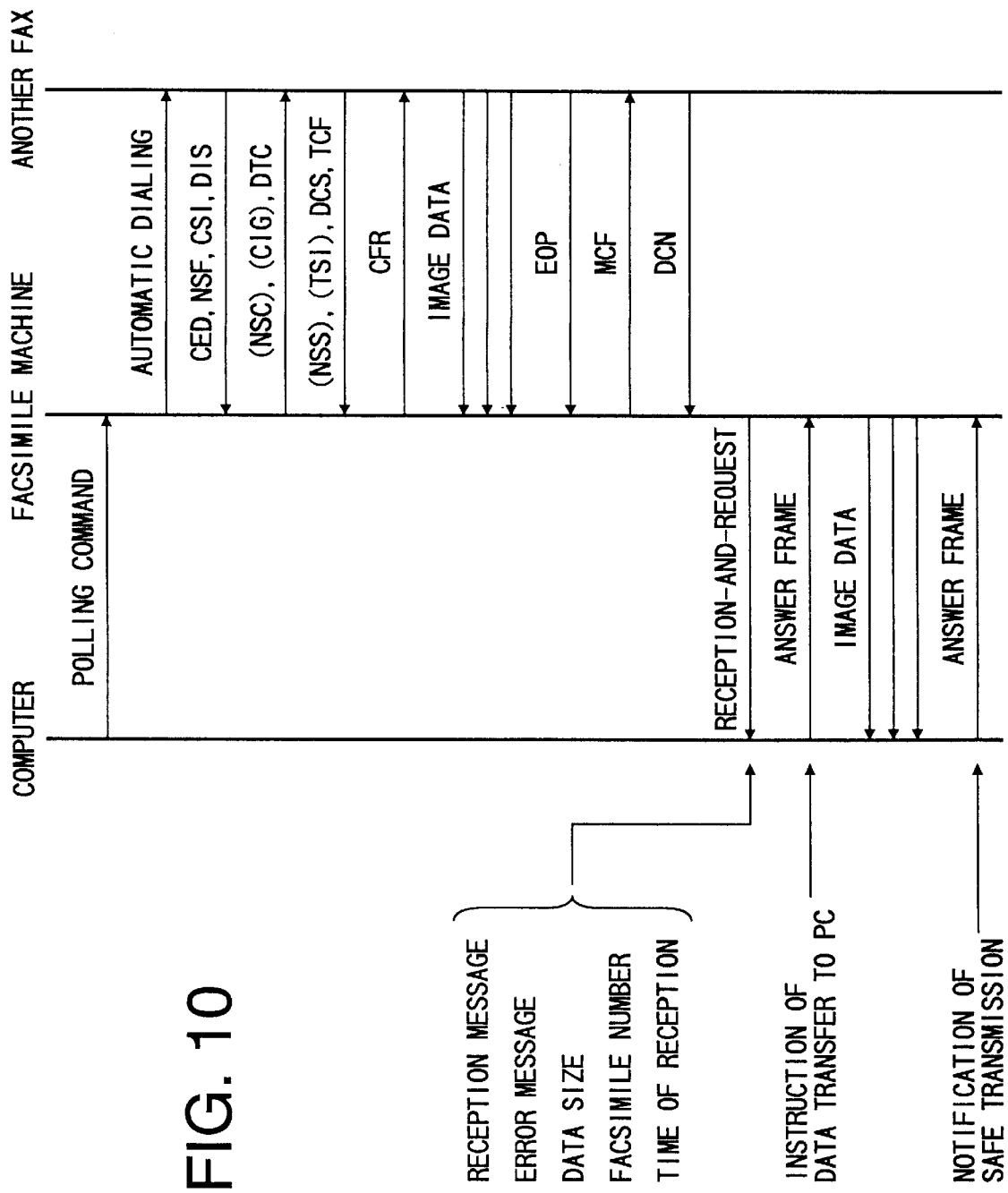

FACSIMILE MACHINE HAVING COMPUTER-LINKED MODE

This is a continuation of application Ser. No. 08/453,581 filed on May 26, 1995, and now abandoned, which is itself a continuation of application Ser. No. 07/913,241 filed on Jul. 14, 1992, also abandoned.

BACKGROUND OF THE INVENTION

1. Technical Field

The present invention relates to a facsimile machine which operates with a computer (called "facsimile machine having a computer-linked mode).

2. Background Art

Recently, a facsimile machine and a telephone share a single line (telephone line). Thus, the facsimile machine can transmit image data, which the operator of the sending side cannot express by his words, to another facsimile machine through the telephone line. This enables an easy and effective information exchange particularly between two distant parties.

The conventional facsimile machine has a function of transmitting and receiving image data to and from another facsimile machine through the telephone line, but does not have a function of transferring the transmitted image data to a computer located away from the receiving side facsimile machine to display the transmitted image data. Further, the conventional facsimile machine has a function of reading the image data from the document, but does not have a function of processing and/or modifying the image data using the computer, a function of administering the image data as a data base using the computer and a function of delayed-transmitting the processed and/or modified image data to another facsimile using the computer.

SUMMARY OF THE INVENTION

The present invention intends to eliminate the above-described problems and its primary object is to provide a novel facsimile machine which has a computer-linked mode as well as an ordinary facsimile mode. The facsimile machine sends and receives the image data via the telephone line in the ordinary facsimile mode.

According to a first aspect of the present invention, there is provided a facsimile machine which is characterized in that the facsimile machine is connected to another facsimile machine (ordinary facsimile machine) via a telephone line and to a computer via an exclusive line. Image data is transmitted between the facsimile machine of the present invention and computer, based on instruction commands from an operator of the computer, and the image data is transmitted between the facsimile machine of the present invention and the ordinary facsimile machine based on an ordinary facsimile transmission procedure. When the facsimile machine of the present invention receives the instruction command from the computer, the facsimile machine of the present invention sends a response signal to the computer in answer to the instruction command, whereby the operator of the computer can monitor or supervise the operation of the facsimile machine of the present invention.

According to this arrangement, the image data transmission between two facsimile machines is performed based on the ordinary facsimile transmission procedure whereby the image data transmission depends upon the capability of another facsimile machine.

On the other hand, the image data transmission between the facsimile machine of the present invention and the computer is performed based on the instruction commands transmitted from the computer via the exclusive line. When the instruction command comes to the facsimile machine or when the facsimile machines takes a certain action based on such an instruction command, the facsimile machine sends back the response signal to the computer to let the operator of the computer know what has occurred on the facsimile machine side.

After the facsimile machine executes something in accordance with the instruction command sent from the computer, the response signal is always given to the computer. Therefore, all the operations of the facsimile machine are under the control of the computer.

BRIEF DESCRIPTION OF THE DRAWINGS

FIG. 9 shows a control procedure when the facsimile machine of the present invention receives image data from another facsimile machine; and FIG. 10 shows a control procedure based on a polling command.

DETAILED DESCRIPTION OF THE PREFERRED EMBODIMENTS

Now, a preferred embodiment of the present invention will be described with reference to the accompanying drawings.

Figure 1:
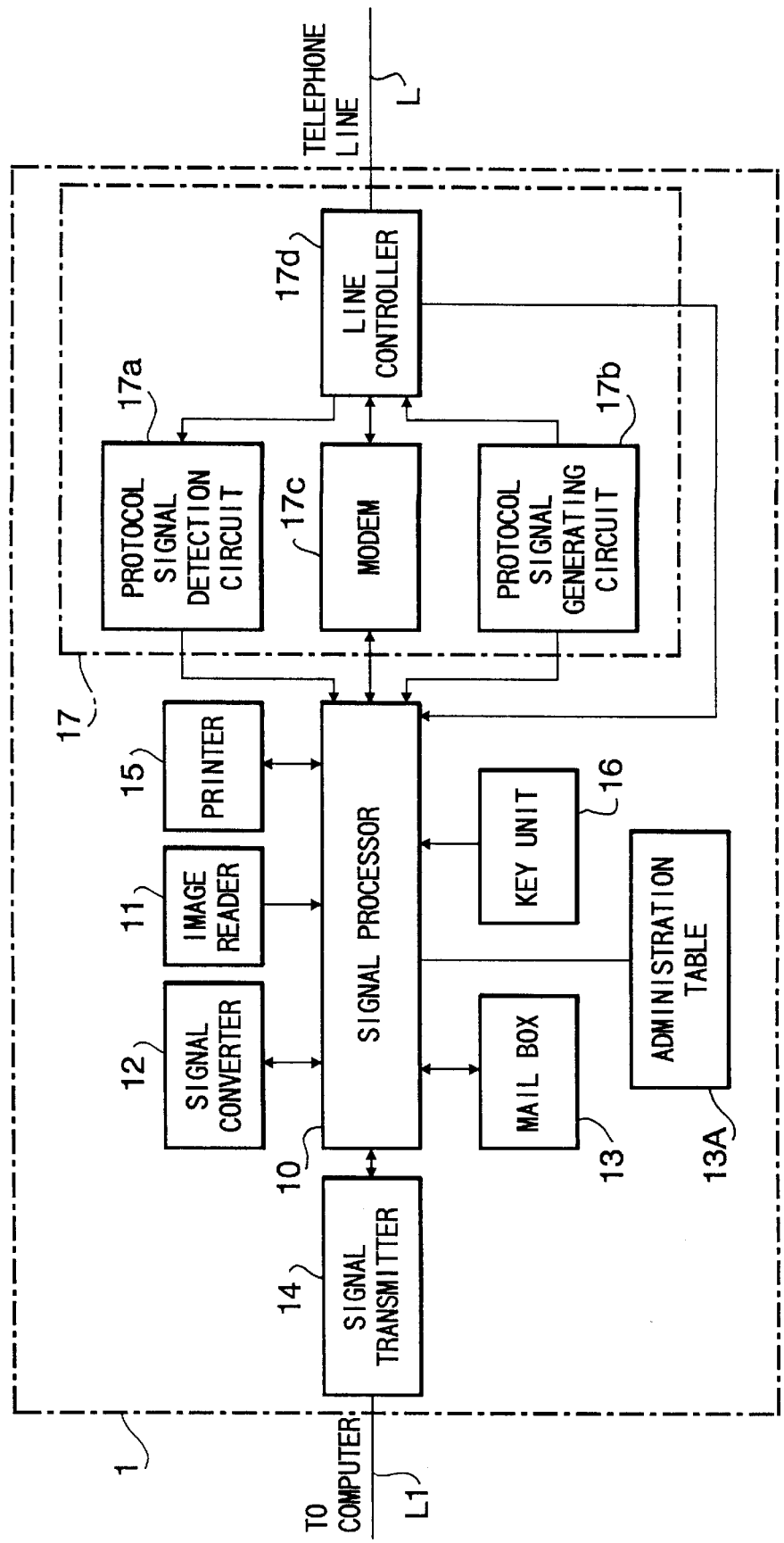
FIG. 1 is a block diagram showing a major structure of a facsimile machine according to the present invention.

Referring to FIG. 1, illustrated is a block diagram of one embodiment of the present invention.

Figure 2:
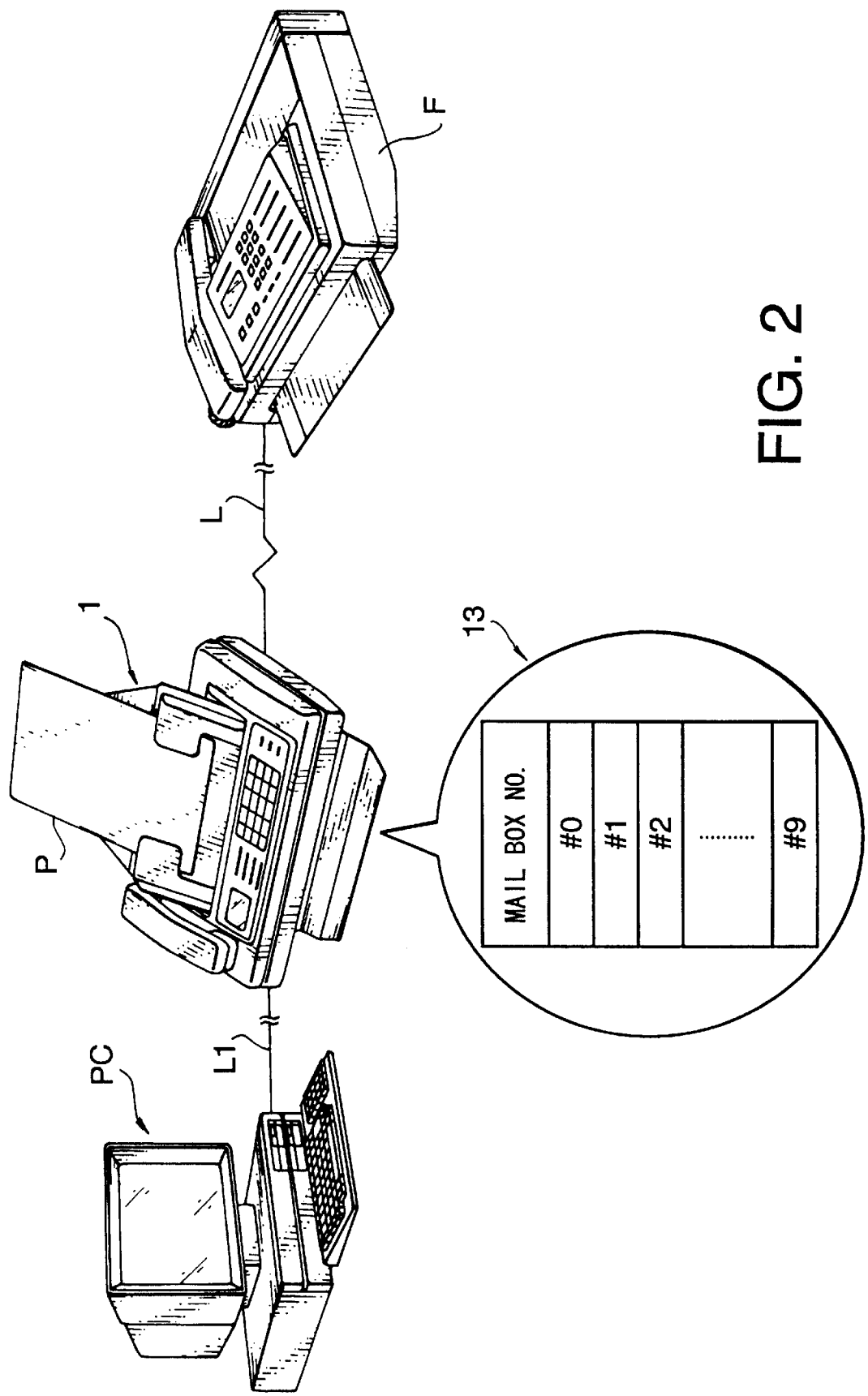
FIG. 2 shows a fundamental conceptual view of an image transmitting and processing system using the facsimile machine of the present invention.

In this illustration, numeral 1 designates a facsimile machine of the present invention, numeral 10 designates a signal processor for processing signals of various components of the facsimile machine 1, numeral 17 designates a facsimile transmission controller for sending/receiving the image data through a telephone line L to/from an ordinary facsimile machine F (FIG. 2) and 14 designates a signal transmitter for sending/receiving the image data and instruction commands to/from a computer PC (FIG. 2) through an exclusive line L1. The computer PC and another facsimile machine F are located apart from the facsimile machine 1 (FIG. 2). The signal processor 10 is comprised of a micro computer unit. These components are provided so that the data transmission between the ordinary facsimile machine and the facsimile machine 1 and between the computer and the facsimile machine 1 can take place.

Numeral 11 designates an image reader for reading the image information from the document and converting it into the image data, numeral 12 designates a signal converter for converting the image data into various kinds of coded data (to be explained later), numeral 13 designates a mail box for storing the image data, numeral 15 designates a printer for printing the image data on a recording sheet and numeral 16 designates a key unit having various operational keys.

In this embodiment, the signal converter 12 can convert the image data, read by the image reader 11, into compressed image data such as MH (Modified Huffman) coded data, or tag bit-incorporated MH coded data or tag bit-incorporated RL (Run Length) coded data. Here, the MH coded data is (i) data obtained by a compression method which is widely used for ordinary facsimile communication conforming with the CCITT standard (International Consultative Committee for Telephone and Telegraph) and (ii) the tag bit-incorporated MH coded data is data obtained under an original standard. In short, the image data is converted into coded data suitable for the computer PC which is connected to the facsimile machine 1.

The mail box 13 is comprised of an image memory having a sufficient capacity (sufficient memory areas) so that a plurality of image data can be stored in the memory areas in accordance with an administration table 13A. Each memory area is assigned a single mail box number and the administration of the mail box is performed using the mail box numbers. The image data read by the image reader 11, the image data transmitted from another facsimile machine F and the image data transmitted from the computer PC are compressed into the MH coded data by the signal converter 12 and these MH coded data are stored in the memory areas of the mail box 13.

The facsimile transmission/reception controller 17 includes a protocol signal detection circuit 17a for receiving a protocol signal coming through the telephone line L, a protocol generation circuit 17b for sending the protocol signal through the telephone line L, a modem 17c for receiving/transmitting the image data and a line controller 17d for connecting/disconnecting the telephone line L.

FIG. 2 shows an example of image transmitting and processing system which has a facsimile machine 1 of the present invention positioned between an ordinary facsimile machine F and a computer PC.

As seen in the illustration, the facsimile machine 1 is connected with the ordinary facsimile machine F by the telephone line L and with the computer PC by the exclusive line L1.

The facsimile machine 1 has a particular image memory which is called "mail box" for receiving/sending the image data from/to the computer PC and ordinary facsimile machine F. The image data is stored in a particular memory area. Each memory area is assigned a mail box number (#0–#9). When the operator specifies a certain mail box number, the image data is stored into the memory area having the same mail box number as that specified by the operator. The image data of the document which is read by the image reader 11 is also stored in the mail box 13 after a certain conversion.

The facsimile machine 1 may have a computer-linked facsimile mode (called "FIP" mode) and an ordinary facsimile mode. "FIP" stands for Fax Interface Processor. In this case, when the operator selects the FIP mode, the facsimile machine 1 operates on the instruction commands from the computer PC and when the operator selects the ordinary facsimile mode, the facsimile machine 1 operates like an ordinary facsimile machine.

Figure 3:
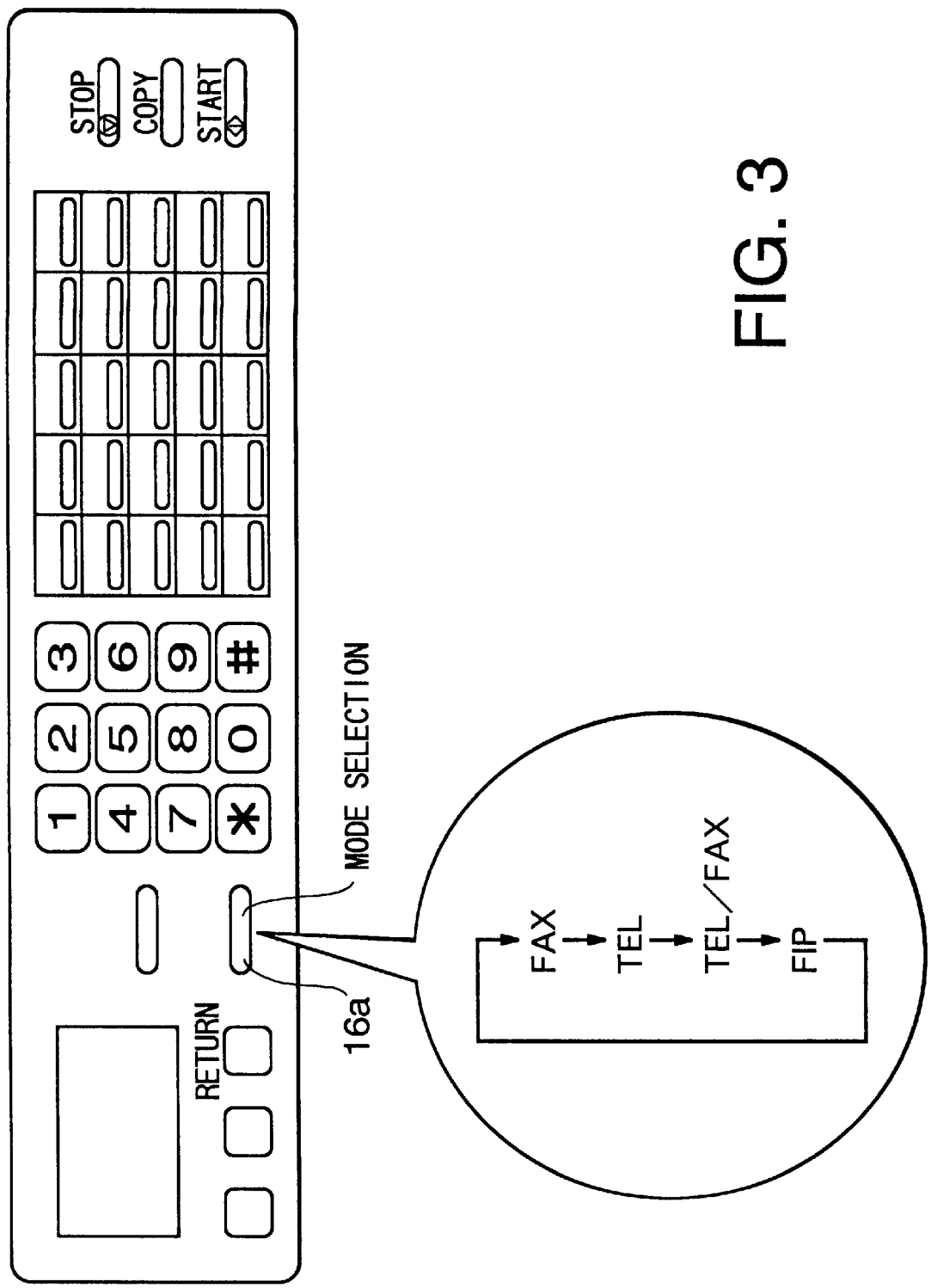
FIG. 3 shows one example of an operation panel of the facsimile machine having a computer-linked mode.

FIG. 3 shows an operation panel, by which the operator performs the mode selection (or switching).

Upon pressing a mode switching key 16a, the mode of the facsimile machine 1 changes in turn to "FAX" mode, "TEL" mode, "TEL/FAX" mode and "FIP" mode. After the "FIP" mode, the mode returns to the first mode, i.e., "FAX" mode.

Now, instruction commands and response signals during the FIP mode will be described.

Figure 4:
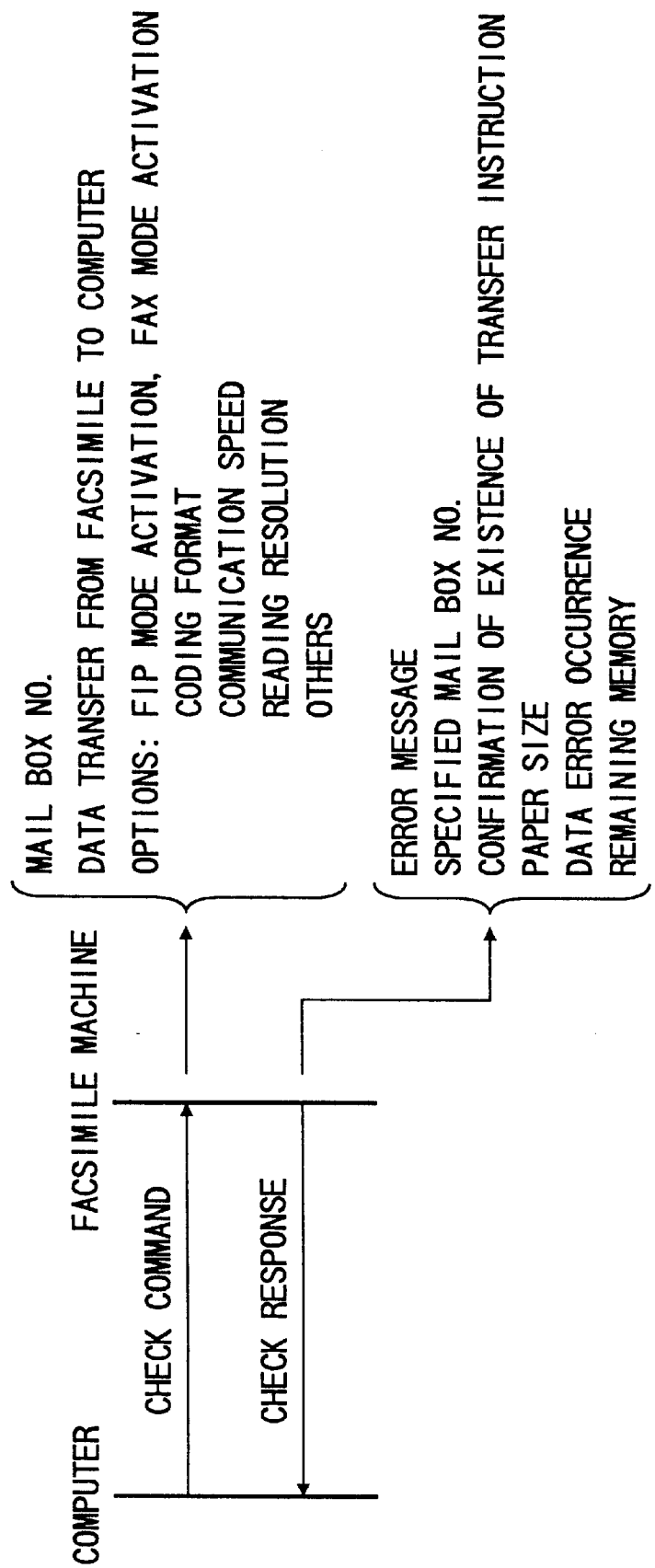
FIG. 4 shows a check command and a check response.

Referring to FIG. 4, illustrated is a detail of a check command and a check response, which are transmitted between the computer PC and the facsimile machine 1 when the operator of the computer PC controls the facsimile machine 1.

The check command sent to the facsimile machine 1 from the computer PC includes various environment-setting parameters. For example, a mail box number of the memory area in the mail box (abbreviated to "MB" hereinafter) to which the image data will be stored and a command of transfer of the image data, which is receivable by the facsimile machine 1 from outside, and sent to the computer PC may be included in the check command. Some optional items may be also included in the check command. Such items may be a FIP mode activation, a FAX mode activation, a format for coding the image data, a communication speed and a reading resolution.

The facsimile machine 1 is switched to the FIP mode if the operator of the computer PC selects the FIP mode activation in the optional items of the check command. The facsimile machine 1 sends the check response to the computer PC after it is switched to the FIP mode.

The check response may include an error message which informs the operator that the check command has not been interpreted or other errors have occurred, a mail box number specified by the check command, a confirmation if the check command includes a data transfer command, a paper size, a transmission error of data transmitted through the exclusive line L1 and an amount of remaining memory in the mail box.

In this way, the check response which answers the check command coming from the computer PC returns to the computer PC, so that the facsimile machine 1 operates under the supervision of the computer PC.

Figure 5:
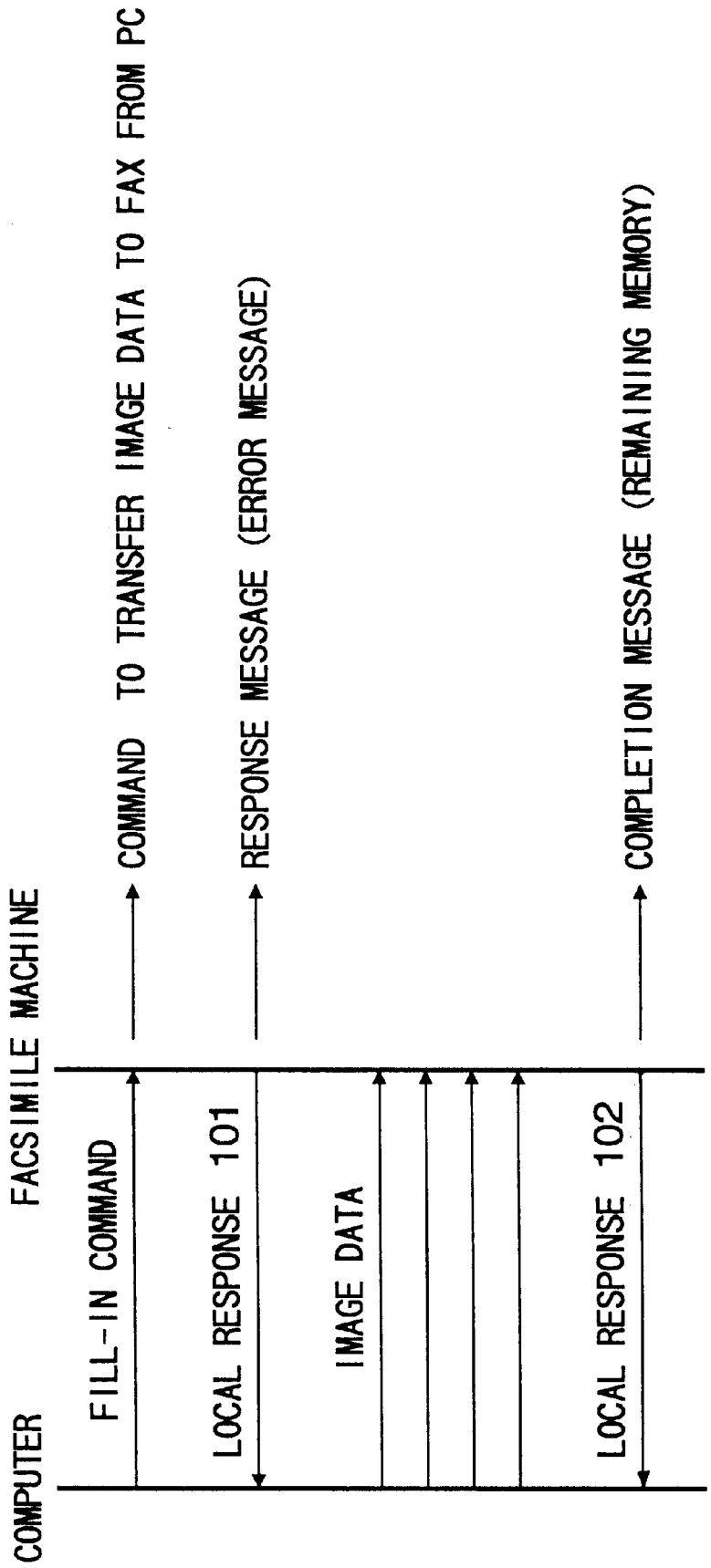
FIG. 5 shows a control procedure based on a fill-in command.

FIG. 5 shows a control procedure based on a fill-in command.

The fill-in command is a command which makes the computer PC transmit the image data to a particular memory area in the mail box MB of the facsimile machine 1.

When the fill-in command is transmitted to the facsimile machine 1 from the computer PC, a local response 101 is sent back to the computer PC from the facsimile machine 1 as a response message which confirms the reception of the fill-in command.

Upon receiving the local response 101, i.e., that the facsimile machine 1 is ready for the data reception, the computer PC sends to the facsimile machine 1 the image data which has been converted into predetermined coded data. The image data are received by the facsimile machine 1 and stored into a specified memory area in the mail box MB. Then, a local response 102 is sent to the computer PC from the facsimile machine 1 to inform it that the image data is duly stored into the specified memory area having the specified mail box number. The local response 102 carries an information which indicates the amount of remaining memory capacity.

Therefore, the operator of the computer PC can know the remaining memory capacity of the facsimile machine 1.

Figure 6:
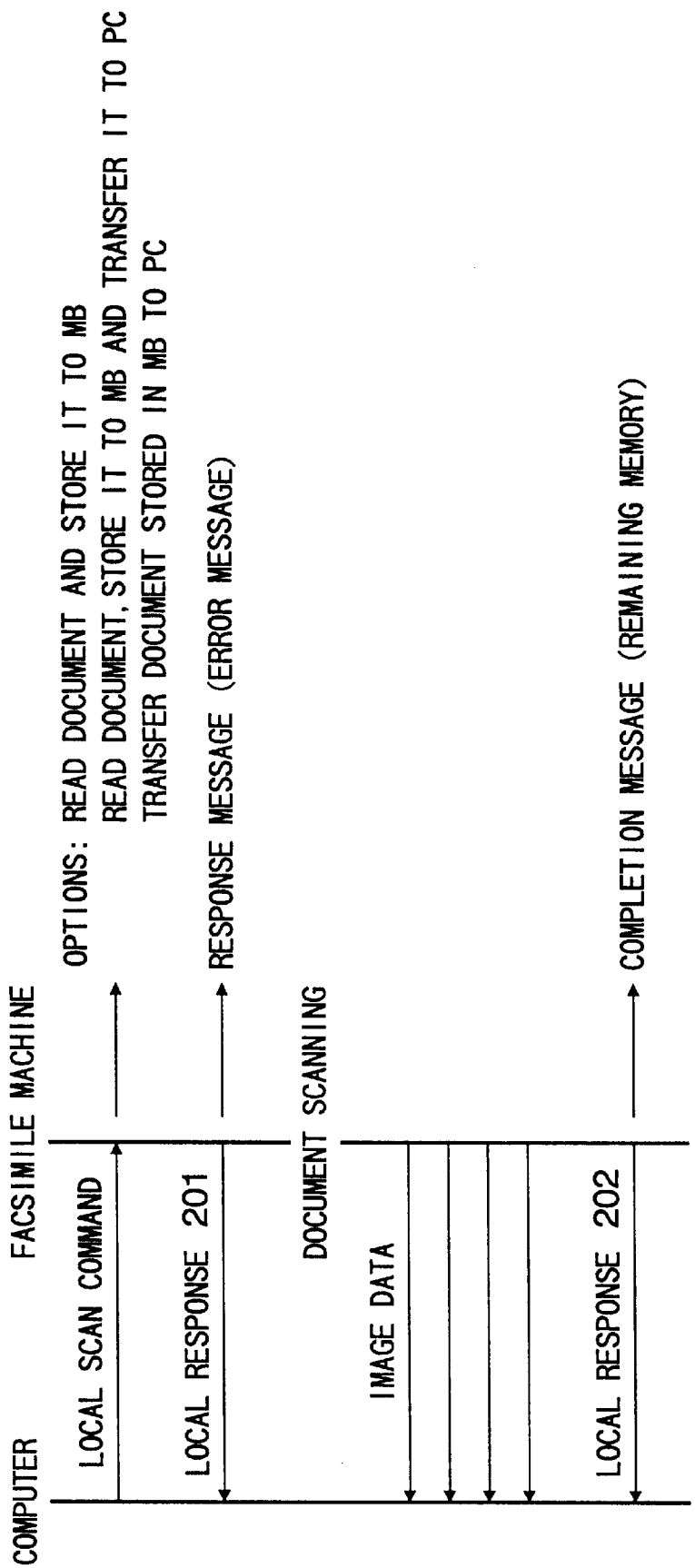
FIG. 6 shows a control procedure based on a local scan command.

FIG. 6 shows a control procedure based on a local scan command.

When the local scan command is output to the facsimile machine 1 from the computer PC, with one of instructions listed in the "OPTIONS" of the local scan command being selected by the operator of the computer PC, the facsimile machine 1 executes such a selected instruction. The instructions listed in the local scan command are: (i) to scan-read the image data and store it into a memory area having a specified mail box number in the mail box MB; (ii) to scan-read the image data and transfer it to the computer PC without any processing; and (iii) to transfer to the computer PC the image data stored in the memory area having the specified mail box number of the mail box MB. In the command (iii), there is no scan-reading before the data transmission.

When the facsimile machine 1 receives the local scan command from the computer PC, a local response 201 is output to the computer PC from the facsimile machine 1. The local response 201 is an answer message.

Receiving the local response 201, the operator of the computer PC can confirm that the facsimile machine 1 has successfully received the local scan command. If the command in the local scan command is not interpreted by the facsimile machine 1, the local response 201 brings an error message to the operator of the computer PC.

If the local scan command carries an instruction "Transfer Image Data To Computer PC", the facsimile machine 1 transmits the image data to the computer PC. Upon completing the image data transmission, the facsimile machine 1 sends the local response 202 to the computer PC, which indicates that the image data transmission is completed and the number of memory areas still vacant.

Figure 7:
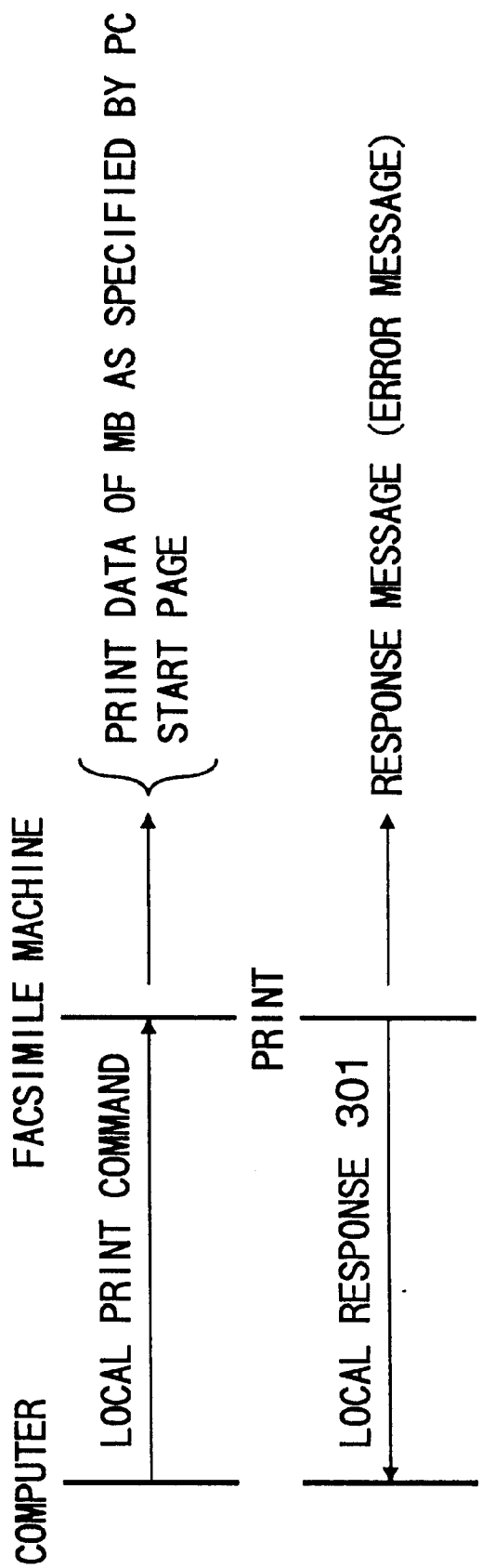
FIG. 7 shows a control procedure based on a local print command.

FIG. 7 shows a control procedure based on a local print command.

The local print command is a command to let the facsimile machine 1 print the image data stored in a memory area of the mail box MB having a mail box number specified by the operator of the computer PC. The operator of the computer PC can also determine which page should be printed first.

When the facsimile machine 1 receives the local print command from the computer PC, the facsimile machine 1 prints the image data stored in the memory area having the specified mail box number.

Upon completing the printing, the facsimile machine 1 sends a local response 301 to the computer PC.

Figure 8:
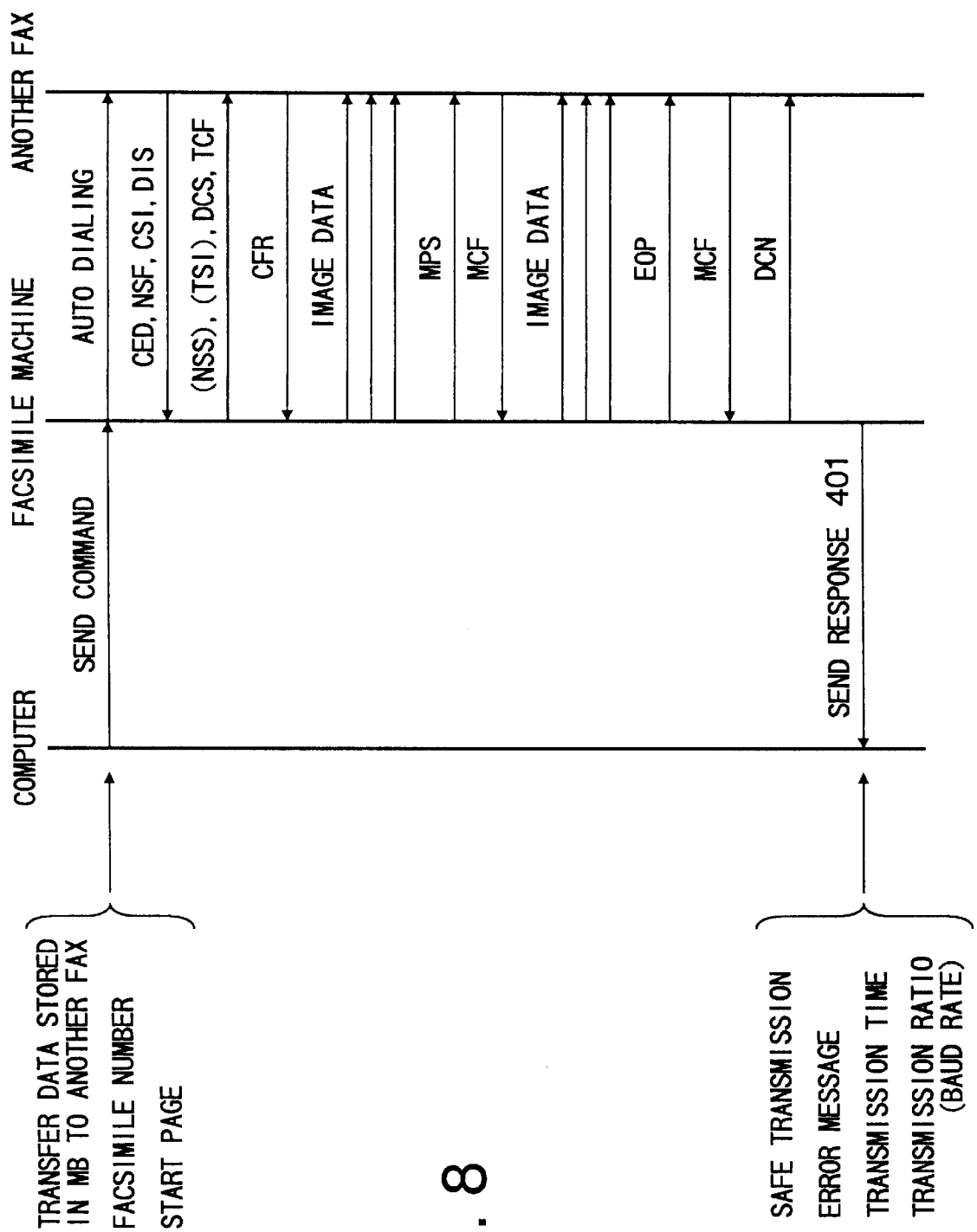
FIG. 8 shows a control procedure based on a send command.

FIG. 8 shows a control procedure based on a second command.

The second command is a command to allow the facsimile machine 1 to transfer to another facsimile machine the image data storied in a memory area having a mail box specified by the operator of the computer PC. The operator of the computer PC can specify in the send command a facsimile number of said other facsimile machine and the first page to be transmitted.

When the facsimile machine 1 receives the send command, the specified facsimile number is automatically dialled. Then, a protocol signal is transmitted between two facsimile machines in an ordinary facsimile transmission manner. Thereafter, the image data is read out from the mail box MB of the facsimile machine 1 and transferred to the receiving side facsimile machine (another facsimile machine).

Upon finishing the ordinary facsimile transmission, the facsimile machine 1 sends a send response 401 to the computer PC.

The send response 401 includes a message such as "Data Transmission Completed" or "Error". Time and ratio of the data transmission are also indicated in the send response 401.

FIG. 9 shows a control procedure when the facsimile machine 1 receives image data from another facsimile machine (not shown).

If the facsimile machine 1 is in the FIP mode, the image data transferred to the facsimile machine 1 from another facsimile machine is stored into a predetermined memory area in the mail box MB of the facsimile machine 1 as the image data reaches the facsimile machine 1. Then, the facsimile machine 1 sends a reception-and-request message to the computer PC to ask if the computer PC wants the facsimile machine 1 to transfer the image data.

The computer PC sends an answer frame to the facsimile machine 1 in response to the reception-and-request. If the answer frame indicates that the computer PC wants the image data which the facsimile machine 1 holds, the facsimile machine 1 reads the image data from the specified memory area in the mail box MB and transfers it to the computer PC. If the facsimile machine 1 does not receive any answer frame from the computer PC, the facsimile machine 1 judges that the computer PC is not operating. In this case, the facsimile machine 1 prints the image date transmitted from another facsimile machine. After the printing, the image data is maintained in the mail box MB of the facsimile machine 1.

The reception-and-request message includes various pieces of information, e.g., "Data Received", "Error", "Data Size is *", "Facsimile Number (of another facsimile) is *", "Jun. 19, 1992 (Date)" and "23:49:14 (Time: Minute: Second:)". The first answer frame is used to command the data transfer to the computer PC from the facsimile machine 1 and the last answer frame is used to inform the facsimile machine 1 of safe receipt of the data.

FIG. 10 shows a control procedure based on a polling command.

The polling command from the computer PC is a command to let the facsimile machine 1 call another facsimile machine and transfer the data sent to the facsimile machine 1 from another facsimile machine, to the computer PC.

When the polling command comes to the facsimile machine 1 from the computer PC, the facsimile machine 1 automatically dials a specified facsimile number to call another facsimile machine. Then, a protocol signal is transmitted between the facsimile machine 1 and another facsimile machine in an ordinary facsimile transmission manner. Thereafter, another facsimile machine transmits the image data to the facsimile machine 1 and the image data is stored into a specified memory area in the mail box MB of the facsimile machine 1.

Upon receiving the image data from another facsimile machine, the facsimile machine 1 sends a reception-and-request message to the computer PC to ask the computer PC if the computer PC wants the image data sent from another facsimile machine. In response to the reception-and-request message, the computer PC sends an answer frame to the facsimile machine 1. If the answer frame indicates that the computer PC needs the image data, the facsimile machine 1 reads the image data from the mail box MB and transfers it to the computer PC. On the other hand, if no answer frame comes to the facsimile machine 1 from the computer PC, the facsimile machine 1 prints the image data on a recording sheet.

After the printing, the image data is maintained in the mail box MB of the facsimile machine 1.

The reception-and-request message includes various pieces of information, e.g., a reception message, error message, date size, facsimile number of another facsimile and time of data reception. The first answer frame is used to command the data transfer to the computer PC and the last answer frame is used to inform the data reception by the computer PC.

According to the present invention, since the facsimile machine 1 of the present invention sends a response message (or signal) to the computer PC in response to various instruction commands from the computer PC, the control of the facsimile machine 1 from the computer side becomes more reliable or the facsimile machine 1 operates under the supervision of the operator of the computer PC.

We claim:

1. A facsimile machine, comprising:
   means for scanning an image on a document,
   means for storing image data associated with the scanned image,
   means for printing the stored image data,
   a telephone line for connecting the facsimile machine to a remote facsimile machine,
   an exclusive line for connecting the facsimile machine to a computer and through which digital signals are directly deliverable to the facsimile machine from the computer,
   means for transmitting image data between the facsimile machine and the remote facsimile machine based on a standard facsimile transmission procedure, the image data comprising at least one of image data received from the computer and stored in a memory and image data scanned by a scanner and stored in a memory,
   means for receiving an instruction command from the computer,
   means for transmitting image data between the facsimile machine and the computer based on an instruction command received from the computer,
   means for sending a response signal from the facsimile machine to the computer when the facsimile machine receives an instruction command from the computer, whereby operation of the facsimile machine is supervisable by the computer,
   a memory for storing data,
   means for calling the remote facsimile machine upon an instruction command from the computer,
   means for receiving image data from the remote facsimile machine,
   means for storing the image data received from the remote facsimile machine in the memory,
   means for transferring the stored image data to the computer in accordance with the instruction command received from the computer, the stored image data comprising at least one of image data received from the remote facsimile machine and stored in a memory and image data scanned by a scanner and stored in a memory, and
   means for transferring data between the computer and the remote facsimile machine in response to a command received from the computer.

2. The facsimile machine of claim 1, wherein the memory for storing data comprises a plurality of memory areas, each of the plurality of memory areas being assigned a number, the data stored in the memory area having a number specified by the instruction command.

3. The facsimile machine of claim 1, wherein the instruction command includes a command for enabling the transfer of data stored in the memory from the facsimile machine to the computer.

4. The facsimile machine of claim 3, wherein the memory comprises means for storing data received by the facsimile machine from a remote facsimile machine.

5. The facsimile machine of claim 1, wherein the means for sending a response signal comprises means for generating a signal indicating that the instruction command is not interpreted by the facsimile machine.

6. The facsimile machine of claim 1, wherein the means for sending a response signal comprises means for generating a signal indicating occurrence of an error when the facsimile machine cannot operate as instructed by the instruction command.

7. The facsimile machine of claim 2, wherein the means for sending a response signal comprises means for sending a signal indicating an amount of vacant memory area in the memory.

8. The facsimile machine of claim 7, wherein the instruction command includes the number of memory areas from which data is to be withdrawn.

9. The facsimile machine of claim 2, comprising:
   means for printing the data stored in the memory in accordance with the instruction command.

10. The facsimile machine of claim 9, wherein the means for sending a response signal comprises means for sending a signal indicating that the means for printing the data has completed printing the data.

11. The facsimile machine of claim 2, comprising:
    means for sending a signal indicative of image data reception to the computer upon receiving the image data from the remote facsimile machine.

12. The facsimile machine of claim 2, comprising:
    means for sending a signal indicative of image data reception to the computer upon receiving the image data from the remote facsimile machine,
    means for transferring the stored data to the computer when a transfer instruction command is received from the computer, and
    means for printing the stored data when a transfer instruction command is not received from the computer.

13. The facsimile machine of claim 11 wherein the means for sending a signal indicative of image date reception comprises means for sending a signal including information identifying a receiving party, the information including at least one of a date on which the image data was received and a time at which the image data was received.

14. The facsimile machine of claim 12 wherein the means for sending a signal indicative of image date reception comprises means for sending a signal including information identifying a receiving party, the information including at least one of a date on which the image data was received and a time at which the image data was received.

15. A communication system, comprising:
    a computer,
    a facsimile machine, the facsimile machine including means for scanning an image on a document, means for storing image data associated with the scanned image, and means for printing the stored image data,
    a telephone line for connecting the facsimile machine to a remote facsimile machine,
    an exclusive line for connecting the facsimile machine to the computer and through which digital signals are directly deliverable to the facsimile machine from the computer, means for transmitting image data between the facsimile machine and the remote facsimile machine based on a standard facsimile transmission procedure, the image data comprising at least one of image data received from the computer and stored in a memory and image data scanned by a scanner and stored in a memory, means for receiving an instruction command from the computer, means for transmitting image data between the facsimile machine and the computer based on an instruction command received from the computer, means for sending a response signal from the facsimile machine to the computer when the facsimile machine receives an instruction command from the computer, whereby operation of the facsimile machine is supervisable by the computer, a memory for storing data, means for calling the remote facsimile machine upon an instruction command from the computer, means for receiving image data from the remote facsimile machine, means for storing the image data received from the remote facsimile machine in the memory, means for transferring the stored image data to the computer in accordance with the instruction command received from the computer, the stored image data comprising at least one of image data received from the remote facsimile machine and stored in a memory and image data scanned by a scanner and stored in a memory, and means for transferring data between the computer and the remote facsimile machine in response to a command received from the computer.

* * * * *